R. B. PADDOCK.
DETACHABLE LINK FOR VEHICLE WHEEL ANTISKID CHAINS.
APPLICATION FILED AUG. 2, 1920.
1,418,392.
Patented June 6, 1922.
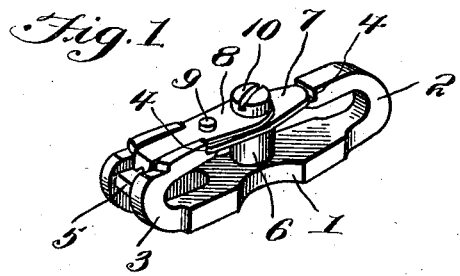
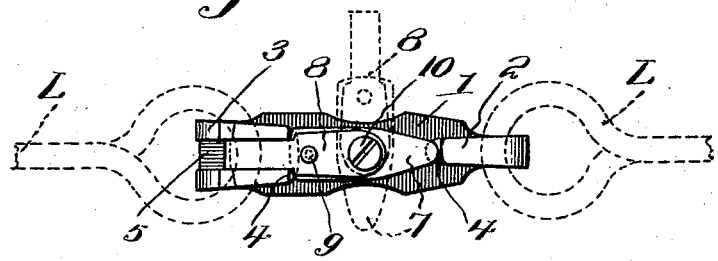
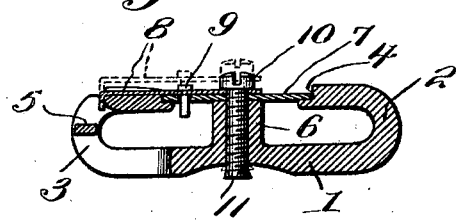
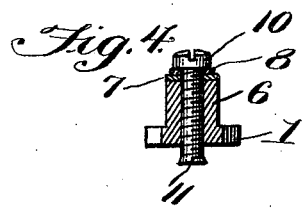
Richard B. Paddock, Inventor

UNITED STATES PATENT OFFICE.

RICHARD B. PADDOCK, OF FORT SILL, OKLAHOMA.

DETACHABLE LINK FOR VEHICLE-WHEEL ANTISKID CHAINS.

1,418,392. Specification of Letters Patent. Patented June 6, 1922.

Application filed August 2, 1920. Serial No. 400,859.

*To all whom it may concern:*

Be it known that I, RICHARD B. PADDOCK, a citizen of the United States of America, residing at Fort Sill, Oklahoma, have invented certain new and useful Improvements in Detachable Links for Vehicle-Wheel Antiskid Chains, of which the following is a specification.

This invention relates to improvements in detachable links for vehicle wheel anti-skid chains and it is the principal object of the invention to provide a link adapted to connect the transverse or gripping chains of an anti-skid device to the longitudinal or anchoring chains thereof in a manner to permit of ready and quick detachment of the gripping chains from the anchoring chains, thus, avoiding considerable effort and loss of time heretofore incident to the detachment of the gripping members of those forms of anti-skid devices employing resilient or spring links as the means for securing the opposite ends of the gripping members to the anchoring means.

Another and equally important object of the invention resides in the provision of a novel latch and the same being so constructed and arranged with relation to the connecting link as to allow opening thereof with the least possible effort or consumption of time upon part of the user, but yet, afford a most positive locking means for insuring connection between the longitudinal and transverse chains of the anti-skid device employing such link.

Other objects will be in part obvious and in part pointed out hereinafter.

In order that the invention and the manner of its application may be readily understood by those skilled in the art, I have in the accompanying illustrative drawings and in the following detailed description based thereon, set forth a preferred embodiment of the invention.

In the drawings: Fig. 1 is a perspective of the improved detachable link; Fig. 2 is the top plan thereof; Fig. 3 is a vertical longitudinal section through the link, and Fig. 4 is a vertical transverse section therethrough.

Having more particular reference to the drawings, in connection with which like reference characters will refer to corresponding parts throughout the several views, my improved detachable link comprises a body portion 1 having hooked end portions 2 and 3, the end portion 2 being reduced and the end portion 3 being enlarged and bifurcated, as shown in Fig. 2. Shoulders or seats 4 are formed on the extremities of the several portions 2 and 3, while a longitudinal way is provided for between the sides of the bifurcated portion 3, said sides being braced in their spaced relation by means of a stud 5. Arranged intermediate the end portions on the body 1 is a hollow internally screw threaded bearing or stud 6 adapted to receive thereon the latching means hereinafter more fully described.

As means for closing the hooked portions 2 and 3 of the detachable link whereby to prevent disengagement between the same and the adjacent links of the longitudinal and transverse chain of an anti-skid device, latching means are provided and include a piece 7 having an opening formed intermediate its ends and arranged adjacent the bearing 6, while an arm 8 is positioned adjacent the same and has one end thereof provided with an opening which aligns with the opening in the intermediate part of the piece of the latch proper 7, while its remaining end is bent at substantially right angles whereby the same will positively engage over the adjacent marginal portion of the seat arranged between the sides of the bifurcated end portions 3 and in the manner described in connection therewith. A pin 9 is preferably carried on the intermediate portion of the arm 8 and loosely engaged with the adjacent portion of the latch proper 7 in order that relative movement laterally between said arm and said latch proper 7 will be prevented, but that relative movement in the opposite direction between said elements will be allowed.

A locking screw 10 is passed through the aligned openings into piece 7 and the arm 8 and is then turned into engagement with the internally screw-threaded bearing 6, the head thereof being arranged in proximity to the latch proper 7 and the arm 8, while the free end of the shank thereof extends for a distance beyond the outer face of the body 1 of the link and is up-set or swaged as shown at 11 to prevent the turning of said locking screw out of engagement entirely with the screw threaded bearing 6 such as might be caused by continued vibration of the link or other stress applied thereto.

In operation, the opposite end portions 2 and 3 of the body of the link are engaged with certain of the links of the longitudinal and transverse chains of an anti-skid device, shown in dotted lines in Fig. 2 and indicated by the reference letter L, the latch 7 and arm 8 having been previously turned to a position at substantially right angles to the end portions to provide sufficient space therebetween to permit of the entrance of said links L. At this time the latch 7 and arm 8, which for the purpose of convenience may be referred to as the latching means, are turned to a position longitudinal of the body 1, whereat the opposite extremities of the piece 7 are engaged in the seats 4 and the end portion of the arm 8 is engaged in the seat arranged between the sides of the bifurcated end portion 3, as clearly shown in the Fig. 2. The locking screw 10 is now turned in a direction to cause binding of its head upon the several elements of the latching means, causing clamping or locking of the same in their respective seats and in consequence serving to effectually close the hooked end portions 2 and 3 whereby disengagement of the several links L therefrom will be prevented. Obviously, the end portion of the arm 8 to be engaged in the seat between the sides of the bifurcated end portion 3 must be raised slightly to allow movement of the same there-into. Such movement is permitted by reason of the connection of the pin 9 with the arm and the piece 7, while, as hereinbefore stated, relative lateral movements between these two elements is prevented. To detach the links L from the hooked portions 2 and 3, the locking screw 10 is turned to effect disengagement of its head from the several elements of the latching means, thus permitting engagement with the end of the arm 8 and the raising of said end out of the seat between the sides of the portion 3. At this time, the piece 7 together with the arm 8 may be rotated to a position at substantially right angles to the body 1 whereby the links L can be freely and quickly removed with the least possible effort and consumption of time upon part of a user.

My improved detachable link, while being herein referred to as a connection for the longitudinal and transverse chains of an anti-skid device, may, of course, be equally well used as a detachable connection between any forms of device of chains or similar connecting device, such as conditions or preference may dictate.

Manifestly, the construction shown is capable of considerable modification and such modification as is within the scope of my claim, I consider within the spirit of my invention.

I claim:

A link of the character described comprising a body portion having its opposite ends hooked, one of said hooked ends having a longitudinally disposed seat therein, and its outer portion cut away to form a shoulder adjacent to the outer end of said seat, each of the hooked ends having transverse seats formed in their inner extremities, a post arranged intermediate the hooked ends of the body portion, a piece pivoted intermediate its ends upon said post for horizontal movement and adapted to close the space occurring between the inner extremities of said hooked ends, the opposite ends of said piece engaging the seats in the extremities of the hooked ends, an arm pivoted for horizontal movement to said post having its free portion reduced and formed with a right angularly bent end portion, said reduced portion engaged in the longitudinally disposed seat, and means for connecting said arm to said piece for permitting of vertical movement therebetween, but adapted to prevent relative horizontal movement therebetween.

RICHARD B. PADDOCK.